(12) United States Patent
Ichikawa

(10) Patent No.: US 7,154,641 B2
(45) Date of Patent: Dec. 26, 2006

(54) IMAGE SCANNING APPARATUS

(75) Inventor: Hirokazu Ichikawa, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 811 days.

(21) Appl. No.: 09/947,370

(22) Filed: Sep. 7, 2001

(65) Prior Publication Data
US 2002/0030861 A1    Mar. 14, 2002

(30) Foreign Application Priority Data
Sep. 11, 2000    (JP) ............................. 2000-274320

(51) Int. Cl.
*H04N 1/04* (2006.01)
(52) U.S. Cl. ...................... 358/483; 358/482; 358/474; 358/497; 250/208.1
(58) Field of Classification Search ................ 358/482, 358/483, 512–514, 497, 494, 474, 475, 487, 358/506, 509; 250/208.1, 234–236, 216; 382/312, 318, 319; 399/211, 212
See application file for complete search history.

(56) References Cited

U.S. PATENT DOCUMENTS

| | | | |
|---|---|---|---|
| 5,483,359 A * | 1/1996 | Yumiba et al. ............. | 358/513 |
| 5,773,814 A * | 6/1998 | Phillips et al. ............ | 250/208.1 |
| 6,166,831 A * | 12/2000 | Boyd et al. ................. | 358/483 |
| 6,496,286 B1 * | 12/2002 | Yamazaki ................... | 385/514 |
| 6,608,301 B1 * | 8/2003 | Liu et al. ..................... | 250/234 |
| 6,667,818 B1 * | 12/2003 | Kuo ........................... | 358/514 |
| 6,765,703 B1 * | 7/2004 | Watanabe ................... | 358/514 |
| 6,965,463 B1 * | 11/2005 | Moritaku et al. ........... | 358/513 |

FOREIGN PATENT DOCUMENTS

| | | |
|---|---|---|
| JP | A 2-63269 | 3/1990 |
| JP | A 2-306786 | 12/1990 |
| JP | A 4-328950 | 11/1992 |
| JP | A 9-46477 | 2/1997 |

* cited by examiner

*Primary Examiner*—Cheukfan Lee
(74) *Attorney, Agent, or Firm*—Oliff & Berridge, PLC

(57) ABSTRACT

A one-dimensional image sensor has N number of photosensitive element arrays arranged parallel to the fast scanning direction, N being a positive integer greater than 1. The adjacent N number photosensitive element arrays are separated from one another by a distance equal to the width of D number arrays in the slow scanning direction. If the moving speed of the one-dimensional image sensor in the slow scanning direction is set to M times as high as an ordinary speed, the distance between the adjacent N number photosensitive element arrays expressed in terms of the width of the D number arrays satisfies the following equation:

$$D = M \cdot a/n$$

where $a \neq nN$, n being a positive integer equal to or smaller than N.

4 Claims, 8 Drawing Sheets

FIG.8

| N=2 LINE M → | 1 | 1.5 | 2 | 3 | 4 | 6 | 8 |
|---|---|---|---|---|---|---|---|
| 1 | 0.50 | 0.75 | 1.00 | 1.50 | 2.00 | 3.00 | 4.00 |
| 2 | 1.00 | 1.50 | 2.00 | 3.00 | 4.00 | 6.00 | 8.00 |
| 3 | 1.50 | 2.25 | 3.00 | 4.50 | 6.00 | 9.00 | 12.00 |
| 4 | 2.00 | 3.00 | 4.00 | 6.00 | 8.00 | 12.00 | 16.00 |
| 5 | 2.50 | 3.75 | 5.00 | 7.50 | 10.00 | 15.00 | 20.00 |
| 6 | 3.00 | 4.50 | 6.00 | 9.00 | 12.00 | 18.00 | 24.00 |
| 7 | 3.50 | 5.25 | 7.00 | 10.50 | 14.00 | 21.00 | 28.00 |
| 8 | 4.00 | 6.00 | 8.00 | 12.00 | 16.00 | 24.00 | 32.00 |
| 9 | 4.50 | 6.75 | 9.00 | 13.50 | 18.00 | 27.00 | 36.00 |
| 10 | 5.00 | 7.50 | 10.00 | 15.00 | 20.00 | 30.00 | 40.00 |
| 11 | 5.50 | 8.25 | 11.00 | 16.50 | 22.00 | 33.00 | 44.00 |
| 12 | 6.00 | 9.00 | 12.00 | 18.00 | 24.00 | 36.00 | 48.00 |
| 13 | 6.50 | 9.75 | 13.00 | 19.50 | 26.00 | 39.00 | 52.00 |
| 14 | 7.00 | 10.50 | 14.00 | 21.00 | 28.00 | 42.00 | 56.00 |
| 15 | 7.50 | 11.25 | 15.00 | 22.50 | 30.00 | 45.00 | 60.00 |
| 16 | 8.00 | 12.00 | 16.00 | 24.00 | 32.00 | 48.00 | 64.00 |
| 17 | 8.50 | 12.75 | 17.00 | 25.50 | 34.00 | 51.00 | 68.00 |
| 18 | 9.00 | 13.50 | 18.00 | 27.00 | 36.00 | 54.00 | 72.00 |
| 19 | 9.50 | 14.25 | 19.00 | 28.50 | 38.00 | 57.00 | 76.00 |
| 20 | 10.00 | 15.00 | 20.00 | 30.00 | 40.00 | 60.00 | 80.00 |

| N=3 LINE M → | 1 | 1.5 | 3 | 4.5 | 6 | 9 | 12 |
|---|---|---|---|---|---|---|---|
| 1 | 0.33 | 0.50 | 1.00 | 1.50 | 2.00 | 3.00 | 4.00 |
| 2 | 0.67 | 1.00 | 2.00 | 3.00 | 4.00 | 6.00 | 8.00 |
| 3 | 1.00 | 1.50 | 3.00 | 4.50 | 6.00 | 9.00 | 12.00 |
| 4 | 1.33 | 2.00 | 4.00 | 6.00 | 8.00 | 12.00 | 16.00 |
| 5 | 1.67 | 2.50 | 5.00 | 7.50 | 10.00 | 15.00 | 20.00 |
| 6 | 2.00 | 3.00 | 6.00 | 9.00 | 12.00 | 18.00 | 24.00 |
| 7 | 2.33 | 3.50 | 7.00 | 10.50 | 14.00 | 21.00 | 28.00 |
| 8 | 2.67 | 4.00 | 8.00 | 12.00 | 16.00 | 24.00 | 32.00 |
| 9 | 3.00 | 4.50 | 9.00 | 13.50 | 18.00 | 27.00 | 36.00 |
| 10 | 3.33 | 5.00 | 10.00 | 15.00 | 20.00 | 30.00 | 40.00 |
| 11 | 3.67 | 5.50 | 11.00 | 16.50 | 22.00 | 33.00 | 44.00 |
| 12 | 4.00 | 6.00 | 12.00 | 18.00 | 24.00 | 36.00 | 48.00 |
| 13 | 4.33 | 6.50 | 13.00 | 19.50 | 26.00 | 39.00 | 52.00 |
| 14 | 4.67 | 7.00 | 14.00 | 21.00 | 28.00 | 42.00 | 56.00 |
| 15 | 5.00 | 7.50 | 15.00 | 22.50 | 30.00 | 45.00 | 60.00 |
| 16 | 5.33 | 8.00 | 16.00 | 24.00 | 32.00 | 48.00 | 64.00 |
| 17 | 5.67 | 8.50 | 17.00 | 25.50 | 34.00 | 51.00 | 68.00 |
| 18 | 6.00 | 9.00 | 18.00 | 27.00 | 36.00 | 54.00 | 72.00 |
| 19 | 6.33 | 9.50 | 19.00 | 28.50 | 38.00 | 57.00 | 76.00 |
| 20 | 6.67 | 10.00 | 20.00 | 30.00 | 40.00 | 60.00 | 80.00 |

| N=4 LINE M → | 1 | 2 | 4 | 6 | 8 | 10 | 12 | 16 |
|---|---|---|---|---|---|---|---|---|
| 1 | 0.25 | 0.50 | 1.00 | 1.50 | 2.00 | 2.50 | 3.00 | 4.00 |
| 2 | 0.50 | 1.00 | 2.00 | 3.00 | 4.00 | 5.00 | 6.00 | 8.00 |
| 3 | 0.75 | 1.50 | 3.00 | 4.50 | 6.00 | 7.50 | 9.00 | 12.00 |
| 4 | 1.00 | 2.00 | 4.00 | 6.00 | 8.00 | 10.00 | 12.00 | 16.00 |
| 5 | 1.25 | 2.50 | 5.00 | 7.50 | 10.00 | 12.50 | 15.00 | 20.00 |
| 6 | 1.50 | 3.00 | 6.00 | 9.00 | 12.00 | 15.00 | 18.00 | 24.00 |
| 7 | 1.75 | 3.50 | 7.00 | 10.50 | 14.00 | 17.50 | 21.00 | 28.00 |
| 8 | 2.00 | 4.00 | 8.00 | 12.00 | 16.00 | 20.00 | 24.00 | 32.00 |
| 9 | 2.25 | 4.50 | 9.00 | 13.50 | 18.00 | 22.50 | 27.00 | 36.00 |
| 10 | 2.50 | 5.00 | 10.00 | 15.00 | 20.00 | 25.00 | 30.00 | 40.00 |
| 11 | 2.75 | 5.50 | 11.00 | 16.50 | 22.00 | 27.50 | 33.00 | 44.00 |
| 12 | 3.00 | 6.00 | 12.00 | 18.00 | 24.00 | 30.00 | 36.00 | 48.00 |
| 13 | 3.25 | 6.50 | 13.00 | 19.50 | 26.00 | 32.50 | 39.00 | 52.00 |
| 14 | 3.50 | 7.00 | 14.00 | 21.00 | 28.00 | 35.00 | 42.00 | 56.00 |
| 15 | 3.75 | 7.50 | 15.00 | 22.50 | 30.00 | 37.50 | 45.00 | 60.00 |
| 16 | 4.00 | 8.00 | 16.00 | 24.00 | 32.00 | 40.00 | 48.00 | 64.00 |
| 17 | 4.25 | 8.50 | 17.00 | 25.50 | 34.00 | 42.50 | 51.00 | 68.00 |
| 18 | 4.50 | 9.00 | 18.00 | 27.00 | 36.00 | 45.00 | 54.00 | 72.00 |
| 19 | 4.75 | 9.50 | 19.00 | 28.50 | 38.00 | 47.50 | 57.00 | 76.00 |
| 20 | 5.00 | 10.00 | 20.00 | 30.00 | 40.00 | 50.00 | 60.00 | 80.00 |

☐ OK  ▨ NG $D = a(M/N)$ (WHERE $a$ IS AN INTEGER, $a \neq nN$)

D : GAP BETWEEN ARRAYS
M : SCANNING SPEED MULTIPLYING FACTOR
N : NUMBER OF ARRAYS ns apparatus. More particularly, it is concerned with an image scanning apparatus which reads an image at a high speed using a one-dimensional image sensor having multiple arrays of photosensitive elements.

IMAGE SCANNING APPARATUS

BACKGROUND OF THE INVENTION

1. Field of the Invention

The present invention relates generally to an image scanning apparatus. More particularly, it is concerned with an image scanning apparatus which reads an image at a high speed using a one-dimensional image sensor having multiple arrays of photosensitive elements.

2. Related Art

Conventionally, a one-dimensional charge-coupled device (CCD) image sensor has been widely used as an image reading device of an image scanning apparatus to achieve high-speed image scanning operation, the one-dimensional CCD image sensor having a single array of photosensitive elements, multiple signal charge transfer electrodes which transfer signal charges taken from the individual elements of the photosensitive array in parallel along separate lines, and signal output sections which convert the signal charges into electric signals and output the electric signals.

The one-dimensional CCD image sensor of this kind has two signal charge transfer electrodes situated on opposite sides of the photosensitive element array, and signal charges produced by photosensitive elements designated by even numbers and those produced by photosensitive elements designated by odd numbers are transferred to the two different signal charge transfer electrodes. These signal charges are output from two signal output sections in parallel through the two-channel signal charge transfer electrodes to thereby achieve a certain degree of high-speed read-out performance. For example, an image scanning apparatus designed to read a document whose width corresponds to that of the A3 paper size (JIS: Japanese Industrial Standard) with a resolution of 400 dots per inch (dpi) employs a two-channel parallel-output one-dimensional CCD image sensor having 5000 effective pixels.

Generally, an output amplifier constituting a signal output section has limitations in frequency characteristics, and the range of signal transfer clock frequency for driving a signal charge transfer electrode is limited correspondingly. Provided that signal charges are read out with a clock frequency of about 20 MHz which is the highest clock frequency according to the frequency characteristics of currently available output amplifiers, an overall data rate achieved with a two-channel configuration would be approximately 40 MHz in terms of signal reading rate. Under these conditions, scanning speed in a slow scanning direction is theoretically 40 (MHz)÷5000 (pixels)÷15.7 (pixels/mm)≈508 (mm/s). Taking into account signal charge shift time and signal charge transfer time taken up by noneffective pixels, practical scanning speed would be approximately 450 mm/s.

With the growing needs for improving image read-out quality of recent year, an image reading resolution of 600 dpi or more has increasingly been required. A one-dimensional CCD image sensor to be used to meet this requirement should have 7500 effective pixels when scanning an A3-size document, for example. As it is necessary to increase the image reading resolution in both fast and slow scanning directions, not only the number of pixels but also the reading resolution in the slow scanning direction needs to be increased. In this situation, the signal reading rate achieved even with a two-channel parallel-output configuration is becoming insufficient in these days.

Another previous approach devised under this circumstance is to divide each of two signal charge transfer electrodes of a one-dimensional CCD image sensor into first and second half portions and individually provide output sections to the divided portions of each signal charge transfer electrode. This provides a 4-channel parallel-output configuration in which signal charges are transferred in different directions (left and right) through the divided portions of the signal charge transfer electrodes to enable even faster signal read-out operation. Provided that the signal charges are read out with a clock frequency of about 20 MHz which is the highest clock frequency according to the frequency characteristics of the currently available output amplifiers, an overall data rate achieved with this 4-channel configuration can be improved up to approximately 80 MHz in terms of signal reading rate.

If signal charges for 7500 pixels necessary for scanning a document whose width corresponds to that of the A3 size (JIS) with a resolution of 600 dpi are to be read out with the above data rate (80 MHz), a theoretical scanning speed is calculated as follows: 80 (MHz)÷7500 (pixels)÷23.6 (pixels/mm)≈452 (mm/s). Even when the signal charge shift time and signal charge transfer time taken up by noneffective pixels are taken into account, a practical scanning speed of approximately 420 mm/s would be obtained.

In the one-dimensional CCD image sensor whose signal charge transfer electrodes situated on opposite sides of a photosensitive element array are divided into the first and second half portions, which are provided with the respective output sections to transfer the signal charges to the left and right directions, forming the 4-channel parallel-output configuration as described above, it is possible to scan approximately 90 sheets of A4-size (JIS) documents per minute when the sheets are scanned in landscape, or horizontal, orientation, although there are restrictions on the scanning mechanism such as that a specific time interval is required between one document and another.

Recent years, however, have seen ever greater increases in the copying speed of digital copying machines, some achieving a printout speed of 100 sheets (A4 size) or over per minute. Nevertheless, since currently available image reading devices have lower working speeds than the printout speed for reasons stated above, it is desired to develop an image scanning apparatus capable of working at higher speeds.

Moreover, there has been a growing demand in recent years for higher resolution and higher image reading speed in image scanning apparatus other than the digital copying machines, such as in a document reader intended for reading a document by use of optical character recognition (OCR) technology.

The prior art proposes an image scanning apparatus as shown in FIG. 7 (e.g., Japanese Laid-open Patent Publication No. 9-46477) to solve the aforementioned problems, in which a halogen lamp 102 projects light onto a document placed on a platen glass 101 and light reflected by the document is guided through a mirror system 103 and a lens 104 and focused onto two one-dimensional CCD image sensors 106, 107 via a semitransparent mirror 105. With this arrangement, the image scanning apparatus simultaneously reads multiple lines of document information with the two one-dimensional CCD image sensors 106, 107 and combines the lines of document information in later signal processing to thereby realize a high-speed image scanning capability.

The aforementioned prior art technology, however, has a problem that it is difficult to achieve high-accuracy positioning of the two one-dimensional CCD image sensors 106, 107, which should be installed at separate positions. Another problem is that when the reflected light is divided by the semitransparent mirror 105, the amount of light decreases in inverse proportion to the number of divisions, making it difficult to read out signal charges with a sufficiently high signal-to-noise (S/N) ratio.

SUMMARY OF THE INVENTION

The present invention has been made in view of the above-described circumstances and provides an image scanning apparatus which can perform two-dimensional document scanning operation using a one-dimensional CCD image sensor with high resolution and high speed without the need for accurate sensor positioning.

According to the invention, an image scanning apparatus has a one-dimensional image sensor, in which the image scanning apparatus obtains two-dimensional information on an image of a document by causing the one-dimensional image sensor to move relatively in a slow scanning direction together with the document while scanning the document image in a fast scanning direction. The one-dimensional image sensor has N number of photosensitive element arrays arranged parallel to the fast scanning direction where N is a positive integer greater than 1. The adjacent N number photosensitive element arrays are separated from one another by a distance equal to the width of D number arrays in the slow scanning direction. If the moving speed of the one-dimensional image sensor in the slow scanning direction is set to M times as high as an ordinary speed at which the resolution in the slow scanning direction becomes equal to the resolution in the fast scanning direction, the distance between the adjacent N number photosensitive element arrays expressed in terms of the width of the D number arrays satisfies the following equation:

$$D = M \cdot a/n$$

where a ≠ nN, n being a positive integer equal to or smaller than N.

Since the N number photosensitive element arrays arranged parallel to the fast scanning direction are separated from one another by the distance equal to the width of D number lines (arrays), D satisfying the above equation, in the image scanning apparatus of the aforementioned construction, the N photosensitive element arrays simultaneously read N different lines of information of the document image. Therefore, the scanning speed in the slow scanning direction can be multiplied by a factor of M without decreasing the image scanning resolution compared to a case where the document image is read by a single array of photosensitive elements.

BRIEF DESCRIPTION OF THE DRAWINGS

Preferred embodiments of the invention will be described, by way of example, referring to the following drawings, in which:

FIG. 8 is a diagram showing specific examples of CCD image sensors according to the invention.

DETAILED DESCRIPTION OF THE INVENTION

Preferred embodiments of the invention are now described in detail in conjunction with the accompanying drawings.

First Embodiment

Figure 1:
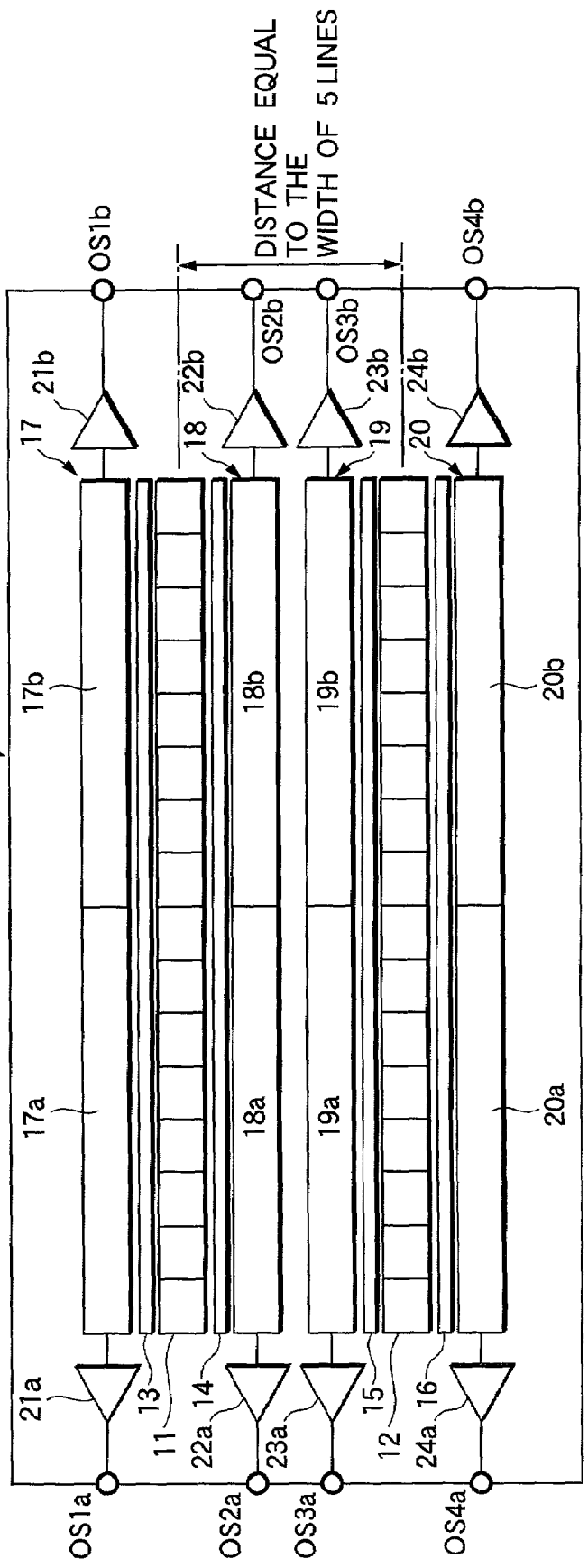
FIG. 1 is a schematic plan view showing the configuration of a one-dimensional CCD image sensor according to a first embodiment of the invention.

FIG. 1 is a schematic plan view showing the configuration of a one-dimensional CCD image sensor 10 according to a first embodiment of the invention. The one-dimensional CCD image sensor 10 of the first embodiment is a two-line image sensor on which a photosensitive element array (array A) 11 and a photosensitive element array (array B) 12 are provided parallel to each other with a distance equal to the width of five lines (arrays) in between in a slow scanning direction, the arrays 11, 12 having 7500 effective photosensitive elements which are necessary for scanning an A3-size document all along its width (short side) with a resolution of 600 dpi.

Provided on opposite sides of the photosensitive element array 11 are signal charge shift gates 13 and 14 for transferring signal charges accumulated in the individual photosensitive elements of the photosensitive element array 11 through photoelectric conversion in vertical directions as illustrated in FIG. 1. Similarly, signal charge shift gates 15 and 16 are provided on opposite sides of the photosensitive element array 12.

Further, on opposite sides of the photosensitive element array 11 outside the signal charge shift gates 13 and 14, there are provided signal charge transfer electrodes 17 and 18 formed of CCDs for transferring the signal charges read out from the photosensitive element array 11 through the signal charge shift gates 13 and 14, respectively. Similarly, signal charge transfer electrodes 19 and 20 formed of CCDs are provided on opposite sides of the photosensitive element array 12 outside the signal charge shift gates 15 and 16.

The signal charge transfer electrodes 17, 18, 19, 20 are each divided approximately at their middle into two signal charge transfer sections 17a, 17b, 18a, 18b, 19a, 19b, 20a, 20b, respectively, for transferring the signal charges read out from the photosensitive element arrays 11, 12 in left and right directions as illustrated.

Final stages located at far ends of the charge-transfer directions of these signal charge transfer sections 17a, 17b, 18a, 18b, 19a, 19b, 20a, 20b are connected respectively to output circuits 21a, 21b, 22a, 22b, 23a, 23b, 24a, 24b, each formed of a signal charge detector for successively detecting the transferred signal charges and converting them into electric signals and an analog circuit such as a source follower or an inverter.

The aforementioned two-line photosensitive element arrays 11, 12 and their signal charge shift gates 13, 14, 15, 16 and their signal charge transfer electrodes 17, 18, 19, 20 (17a, 17b, 18a, 18b, 19a, 19b, 20a, 20b) and output circuits 21a, 21b, 22a, 22b, 23a, 23b, 24a, 24b are all created on a single semiconductor substrate.

Now, signal charge transfer operation of the two-line (two-array) one-dimensional CCD image sensor 10 of the aforementioned construction of the first embodiment is described.

Signal charges produced by the individual photosensitive elements of the photosensitive element arrays 11, 12 through photoelectric conversion and accumulated therein are sent to the signal charge transfer sections 17a, 17b, 18a, 18b, 19a, 19b, 20a, 20b via the signal charge shift gates 13, 14, 15, 16, wherein the signal charges produced by each of the photosensitive element arrays 11, 12 are handled in two groups, that is, the signal charges output from the photosensitive elements designated by odd numbers (hereinafter referred to as the odd-numbered photosensitive elements) and the signal charges output from the photosensitive elements designated by even numbers (hereinafter referred to as the even-numbered photosensitive elements).

The signal charge transfer sections 17a, 17b, 18a, 18b, 19a, 19b, 20a, 20b are two-phase-controlled CCDs. Specifically, signal charge transfer operation of the signal charge transfer sections 17a, 17b, 18a, 18b, 19a, 19b, 20a, 20b is controlled by two 20 MHz clock signals of different phases, for example, to successively transfer the signal charges derived from the photosensitive element arrays 11, 12.

In this signal charge transfer operation, the signal charges transferred leftward as illustrated in FIG. 1 by the signal charge transfer sections 17a, 18a, 19a, 20a are sent to the output circuits 21a, 22a, 23a, 24a, respectively. Also, the signal charges transferred rightward as illustrated by the signal charge transfer sections 17b, 18b, 19b, 20b are sent to the output circuits 21b, 22b, 23b, 24b, respectively.

The signal charges produced by the photosensitive element arrays 11, 12 are led to the respective output circuits 21a, 21b, 22a, 22b, 23a, 23b, 24a, 24b, each formed of a signal charge detector and an analog circuit such as a source follower or an inverter, in this way. The signal charges are then output in parallel through 8 channels as voltage signals OS1a (derived from a first half of the odd-numbered photosensitive elements of the array A), OS1b (derived from a second half of the odd-numbered photosensitive elements of the array A), OS2a (derived from a first half of the even-numbered photosensitive elements of the array A), OS2b (derived from a second half of the even-numbered photosensitive elements of the array A), OS3a (derived from a first half of the odd-numbered photosensitive elements of the array B), OS3b (derived from a second half of the odd-numbered photosensitive elements of the array B), OS4a (derived from a first half of the even-numbered photosensitive elements of the array B), and OS4b (derived from a second half of the even-numbered photosensitive elements of the array B).

The aforementioned 8-channel voltage signal outputs are delivered to an external signal processing circuit, which converts the 8-channel input voltage signals into voltage signals conforming geometrically to the arrangement of the photosensitive element arrays 11, 12 (arrays A and B). Shown in FIG. 2 is an example of the configuration of the signal processing circuit.

Figure 2:
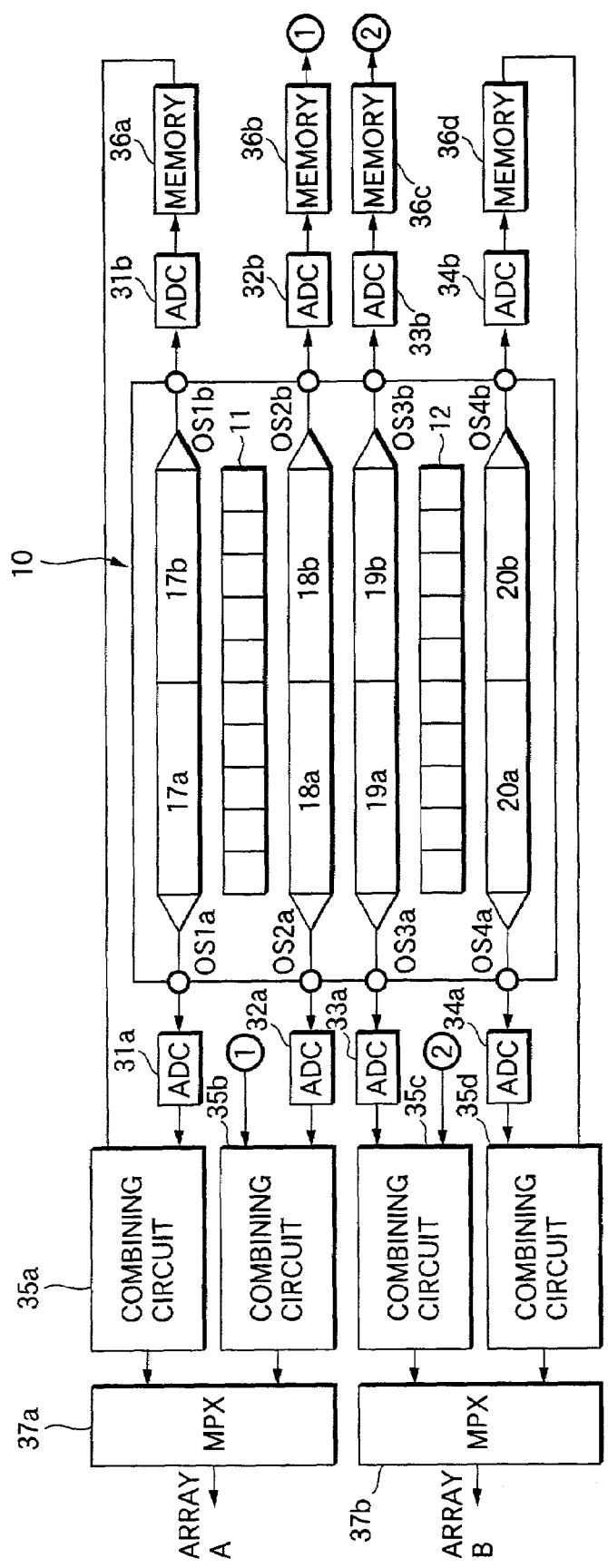
FIG. 2 is a block diagram showing an example of the configuration of a signal processing circuit for processing output signals of the one-dimensional CCD image sensor according to the first embodiment.

Referring to FIG. 2, the voltage signals OS1a output from the first half of the odd-numbered photosensitive elements of the array A, the voltage signals OS2a output from the first half of the even-numbered photosensitive elements of the array A, the voltage signals OS3a output from the first half of the odd-numbered photosensitive elements of the array B, and the voltage signals OS4a output from the first half of the even-numbered photosensitive elements of the array B are converted into digital data by analog-to-digital converters (ADCs) 31a, 32a, 33a and 34a, respectively, and these digital data are entered to signal-combining circuits 35a, 35b, 35c and 35d as first halves of their inputs.

On the other hand, the voltage signals OS1b output from the second half of the odd-numbered photosensitive elements of the array A, the voltage signals OS2b output from the second half of the even-numbered photosensitive elements of the array A, the voltage signals OS3b output from the second half of the odd-numbered photosensitive elements of the array B, and the voltage signals OS4b output from the second half of the even-numbered photosensitive elements of the array B are converted into digital data by ADCs 31b, 32b, 33b and 34b, respectively, and these digital data are temporarily stored in memories 36a, 36b, 36c and 36d. The memories 36a, 36b, 36c and 36d reverse the order of the digital data so that they are rearranged in conformity with the true geometrical arrangement of the second halves of the photosensitive elements of the photosensitive element arrays 11, 12, and these rearranged digital data are entered to the signal-combining circuits 35a, 35b, 35c and 35d as second halves of their inputs.

The signal-combining circuits 35a, 35b, 35c and 35d recombine the voltage signals OS1a, OS2a, OS3a and OS4a output from the first halves of the photosensitive elements of the arrays A and B with the voltage signals OS1b, OS2b, OS3b and OS4b output from the second halves of the photosensitive elements of the arrays A and B, respectively, such that the former signals are followed by the latter signals. The signal-combining circuits 35a, 35b, 35c and 35d then output the recombined 4-channel voltage signals derived from the odd-numbered photosensitive elements of the array A, the even-numbered photosensitive elements of the array A, the odd-numbered photosensitive elements of the array B and the even-numbered photosensitive elements of the array B to multiplexers 37a and 37b.

The multiplexer 37a rearranges the voltage signals for the odd-numbered and even-numbered photosensitive elements of the array A according to the true geometrical arrangement of the photosensitive elements of the photosensitive element array 11 and outputs the rearranged voltage signals for one line (array A). Also, the multiplexer 37b rearranges the voltage signals for the odd-numbered and even-numbered photosensitive elements of the array B according to the true geometrical arrangement of the photosensitive elements of the photosensitive element array 12 and outputs the rearranged voltage signals for one line (array B). These signals for the two lines are sequentially stored in a memory which is not illustrated.

Described below is how the two-line image sensor thus constructed scans a document image when its scanning speed in the slow scanning direction is set to twice as high as an ordinary scanning speed. Here, the ordinary scanning speed refers to a scanning speed at which the resolution in the slow scanning direction equals the resolution in a fast scanning direction.

Figure 3:
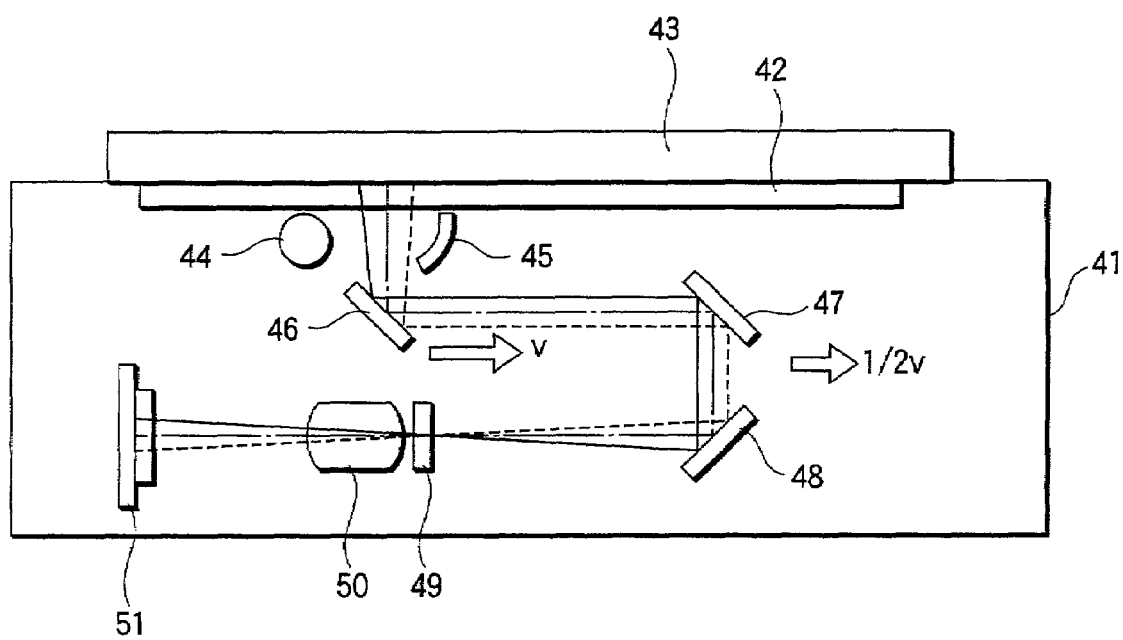
FIG. 3 is a schematic construction diagram of an image scanning apparatus according to the invention.

FIG. 3 is a schematic construction diagram of an image scanning apparatus employing an image sensor according to the present embodiment of the invention.

Referring to FIG. 3, there is provided a platen glass 42 for placing a document at a top opening of a cabinet 41. The document is placed on the platen glass 42 with an image to be scanned facing down (not shown). A platen cover 43 swingable about its one hinged end is attached to an upper part of the cabinet 41. The platen cover 43 is placed on top of the document placed on the platen glass 42 when scanning the image to keep the document in close contact with the platen glass 42.

The cabinet 41 accommodates a lamp 44 for projecting light onto the document set on the platen glass 42, a reflector 45 for effectively converging the light emitted from the lamp 44 onto the surface of the document, a first mirror 46 for reflecting the light reflected by the document in a horizontal direction, a second mirror 47 for reflecting the light reflected by the first mirror 46 downward, and a third mirror 48 for reflecting the light reflected by the second mirror 47 in a horizontal direction.

Among the aforementioned components, the lamp 44, the reflector 45 and the first mirror 46 are installed in a full-rate carriage (not shown) which moves at speed v in the direction of an arrow. Also, the first and second mirrors 47, 48 are fitted in a half-rate carriage (not shown) which moves at speed 0.5 v in the direction of the arrow.

The cabinet 41 further accommodates a sagittal stopper 49 which serves as light-blocking device, a lens 50 for focusing the reflected light from the document surface, and an image sensor 51 for converting the light focused thereupon by the lens 50 into electric signals. This image sensor 51 is the two-line image sensor of the aforementioned first embodiment.

The image scanning apparatus thus constructed scans the document image at a speed twice as high as the ordinary scanning speed selected when scanning the image with a resolution of 600 dpi. This means that the image scanning apparatus scans two lines (approximately 84.7 micrometers wide) of the image while moving the full-rate carriage in the slow scanning direction within a period during which a conventional image scanning apparatus would usually scan a single line (approximately 42.3 micrometers wide) of the image.

Eight-channel analog voltage signals (signal charges) sequentially output in parallel every image reading cycle are converted into digital form by the signal processing circuit as shown in FIG. 2, for example. The signal processing circuit further performs such signal processing operations as inversion of the order of the A/D-converted signals derived from the second halves of the photosensitive elements, recombination of the signals derived from the first and second halves of the photosensitive elements, and rearrangement of the signal charges by means of the memories 36a, 36b, 36c, 36d and associated circuit elements. The signals for one line picked up by the array A and the signals for another one line picked up by the array B are then sequentially stored in the unillustrated memory.

Figure 4:
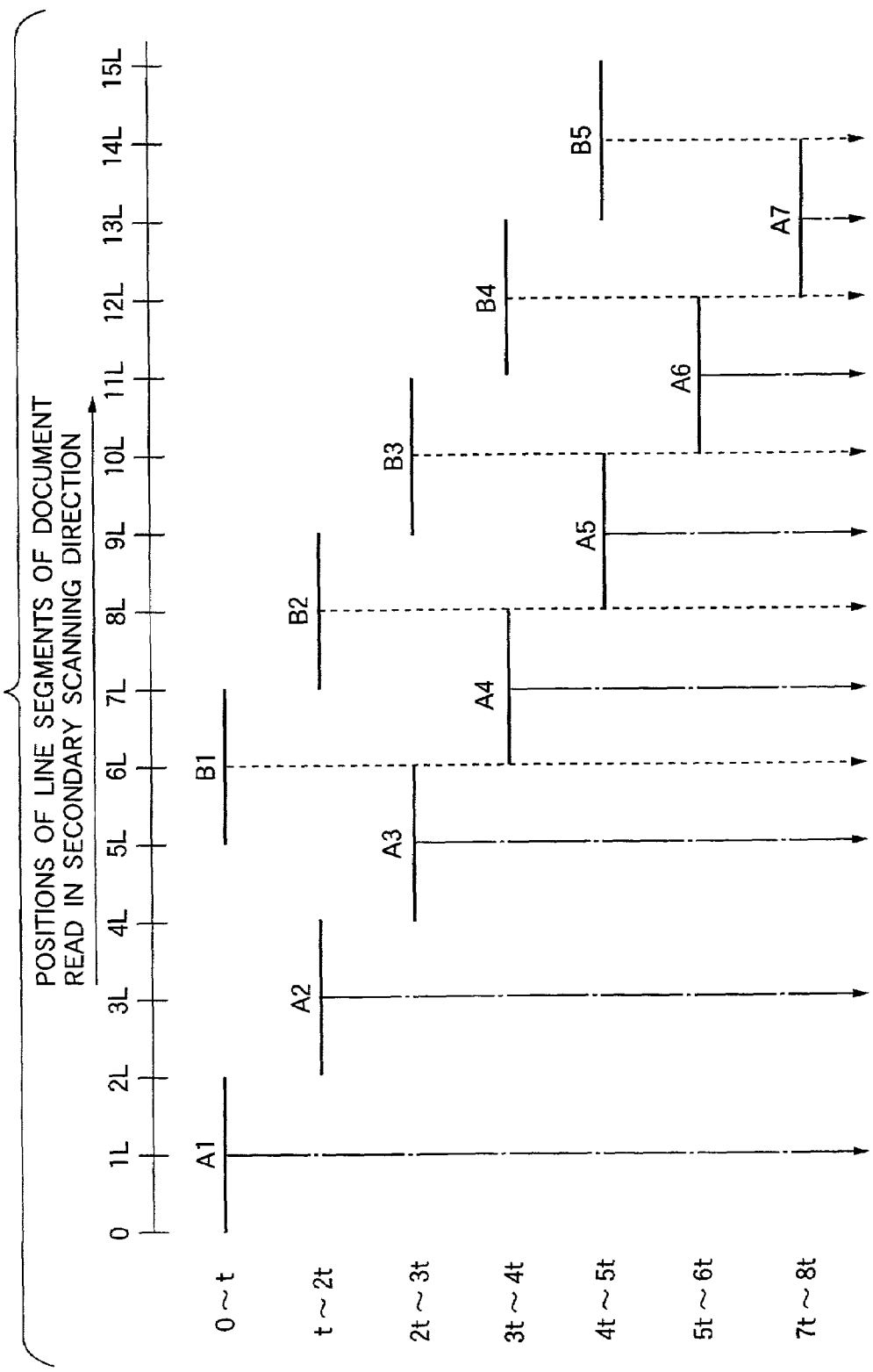
FIG. 4 is a chart showing the positions of line segments read by the one-dimensional CCD image sensor of the first embodiment in individual image reading periods.

FIG. 4 shows a relationship between the positions of line segments read by the arrays A and B and their image reading periods. In this Figure, a line segment representing read-out information A1 output from the photosensitive element array 11 (array A) during the period 0-t indicates that the information A1 is an integral of pieces of information picked up from points 0 through 2L in the slow scanning direction of the document. It follows that the resolution in the slow scanning direction of the information individually read by the arrays A and B is 600/2 dpi=300 dpi.

As can be seen from FIG. 4, the position of a line segment read by the array A during a given image reading period is separated from the position of a line segment read by the array B during the same image reading period by as much as the width of five lines. For example, read-out information B1 read by the array B is the information derived from a middle point located just between read-out information A3 read by the array A and read-out information A4 read by the array A. This means that if the read-out information read by the array A the read-out information read by the array B are combined with a time lag equal to 2.5 times the image reading cycle, that is, if the two sets of read-out information stored in the memory are rearranged and output with this time lag, it is possible to achieve a resolution of 600 dpi in the slow scanning direction which is twice as high as the resolution (300 dpi) of information lines read by the individual arrays A, B in the slow scanning direction. In other words, it is possible to scan document information at a speed twice as high as the ordinary scanning speed without reducing the resolution in the slow scanning direction.

Provided that the clock frequency used for driving the two-line image sensor is 20 MHz, data rates of the individual output circuits 21a, 21b, 22a, 22b, 23a, 23b, 24a, 24b are all 20 MHz and, therefore, data rates of the individual output signals of the arrays A and B are 20 MHz×4=80 MHz each. Since the signals produced by the arrays A and B are output simultaneously, an overall data rate is 160 MHz.

It is understood from the foregoing that the image scanning apparatus employing the two-line one-dimensional CCD image sensor of the first embodiment can achieve twice as high a scanning speed as the scanning speed obtained with a conventional image sensor having 4-channel outputs using one-dimensional CCD image sensor technology of the currently available performance.

Furthermore, since the distance between the photosensitive element arrays 11 and 12 of the two-line one-dimensional CCD image sensor of the first embodiment is fixedly determined in its manufacturing stage, the two-line one-dimensional CCD image sensor confers an advantage that precise positioning is not required when assembling it in the image scanning apparatus. In addition, since the light reflected by the document falls upon the CCD image sensor without being divided into different paths, the amount of light exposure of the CCD image sensor does not decrease, making it possible to read out the signal charges with a sufficiently high S/N ratio.

While the foregoing description of the first embodiment has dealt with an example of configuration in which the photosensitive element arrays 11 and 12 each has 4-channel output sections from which the signal charges picked up by the arrays 11 and 12 are read out, the invention is not limited to this configuration. The configuration may be modified such that the arrays 11 and 12 each has two-channel output sections or a one-channel output section, for example, depending on applications.

Furthermore, while the photosensitive element arrays 11 and 12 of the two-line CCD image sensor 10 of the foregoing first embodiment are separated by a distance equal to the width of five lines (arrays), this distance is not necessarily limited to the width of five lines. The distance may be equal to the width of seven lines or nine lines, for example, as long as conditions expressed by an equation shown below are satisfied.

Specifically, when the scanning speed in the slow scanning direction is set to M times as high as the ordinary scanning speed so that the resolution in the slow scanning direction becomes equal to the resolution in the fast scanning direction, the distance between N number of lines of photosensitive element arrays (expressed in terms of the width of D lines) should satisfy the following equation:

$$D = M \cdot a/n$$

where n is a positive integer equal to or smaller than N, and "a" is a positive integer when n=N, a noninteger when n<N.

Furthermore, although the two-line CCD image sensor 10 of the first embodiment having the two photosensitive element arrays 11, 12 scans the document image at a speed twice as high as the ordinary scanning speed in the slow scanning direction, the scanning speed is not limited to an integral number of times (e.g. twice) the ordinary scanning speed. It may, for example, be 1.5 times or other noninteger times the ordinary scanning speed.

Second Embodiment

Figure 5:
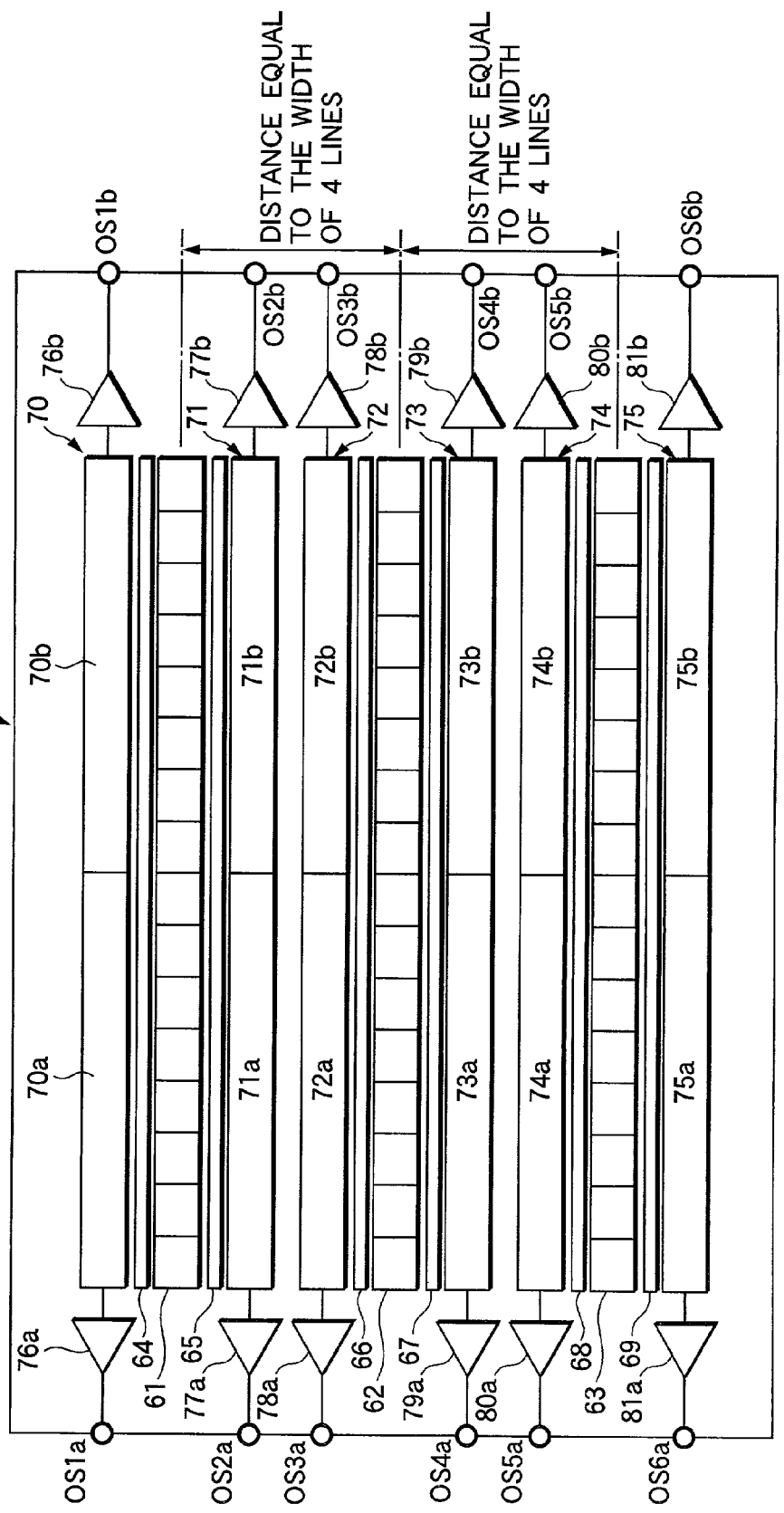
FIG. 5 is a schematic plan view showing the configuration of a one-dimensional CCD image sensor according to a second embodiment of the invention.

FIG. 5 is a schematic plan view showing the configuration of a one-dimensional CCD image sensor 60 according to a second embodiment of the invention. The one-dimensional CCD image sensor 60 is a three-line image sensor on which a photosensitive element array (array A) 61, a photosensitive element array (array B) 62 and a photosensitive element array (array C) 63 are provided parallel to each other with a distance equal to the width of four lines (arrays) in between in a slow scanning direction, the arrays 61, 62, 63 having 7500 effective photosensitive elements which are necessary for scanning an A3-size document all along its width (short side) with a resolution of 600 dpi.

Provided on opposite sides of the photosensitive element array 61 are signal charge shift gates 64 and 65 for transferring signal charges accumulated in the individual photosensitive elements of the photosensitive element array 61 through photoelectric conversion in vertical directions as illustrated in FIG. 5. Similarly, signal charge shift gates 66 and 67 are provided on opposite sides of the photosensitive element array 62, and signal charge shift gates 68 and 69 are provided on opposite sides of the photosensitive element array 63.

Further, on opposite sides of the photosensitive element array 61 outside the signal charge shift gates 64 and 65, there are provided signal charge transfer electrodes 70 and 71 formed of CCDs for transferring the signal charges read out from the photosensitive element array 61 through the signal charge shift gates 64 and 65, respectively. Similarly, signal charge transfer electrodes 72 and 73 formed of CCDs are provided on opposite sides of the photosensitive element array 62 outside the signal charge shift gates 66 and 67, and signal charge transfer electrodes 74 and 75 formed of CCDs are provided on opposite sides of the photosensitive element array 63 outside the signal charge shift gates 68 and 69.

The signal charge transfer electrodes 70, 71, 72, 73, 74, 75 are each divided approximately at their middle into two signal charge transfer sections 70a, 70b, 71a, 71b, 72a, 72b, 73a, 73b, 74a, 74b, 75a, 75b, respectively, for transferring the signal charges read out from the photosensitive element arrays 61, 62, 63 in left and right directions as illustrated.

Final stages located at far ends of the charge-transfer directions of these signal charge transfer sections 70a, 70b, 71a, 71b, 72a, 72b, 73a, 73b, 74a, 74b, 75a, 75b are connected respectively to output circuits 76a, 76b, 77a, 77b, 78a, 78b, 79a, 79b, 80a, 80b, 81a, 81b, each formed of a signal charge detector for successively detecting the transferred signal charges and converting them into electric signals and an analog circuit such as a source follower or an inverter.

The aforementioned three-line photosensitive element arrays 61, 62, 63 and their signal charge shift gates 64, 65, 66, 67, 68, 69, and their signal charge transfer channels 70, 71, 72, 73, 74, 75 (70a, 70b, 71a, 71b, 72a, 72b, 73a, 73b, 74a, 74b, 75a, 75b) and output circuits 76a, 76b, 77a, 77b, 78a, 78b, 79a, 79b, 80a, 80b, 81a, 81b, are all created on a single semiconductor substrate.

Now, signal charge transfer operation of the three-line (three-array) one-dimensional CCD image sensor 60 of the aforementioned construction of the second embodiment is described.

Signal charges produced by the individual photosensitive elements of the photosensitive element arrays 61, 62, 63 through photoelectric conversion and accumulated therein are sent to the signal charge transfer sections 70a, 70b, 71a, 71b, 72a, 72b, 73a, 73b, 74a, 74b, 75a, 75b via the signal charge shift gates 64, 65, 66, 67, 68, 69, wherein the signal charges produced by each of the photosensitive element arrays 61, 62, 63 are handled in two groups, that is, the signal charges output from the photosensitive elements designated by odd numbers (hereinafter referred to as the odd-numbered photosensitive elements) and the signal charges output from the photosensitive elements designated by even numbers (hereinafter referred to as the even-numbered photosensitive elements).

The signal charge transfer sections 70a, 70b, 71a, 71b, 72a, 72b, 73a, 73b, 74a, 74b, 75a, 75b are two-phase-controlled CCDs. Specifically, signal charge transfer operation of the signal charge transfer sections 70a, 70b, 71a, 71b, 72a, 72b, 73a, 73b, 74a, 74b, 75a, 75b is controlled by two 20 MHz clock signals of different phases, for example, to successively transfer the signal charges derived from the photosensitive element arrays 61, 62, 63.

In this signal charge transfer operation, the signal charges transferred leftward as illustrated in FIG. 5 by the signal charge transfer sections 70a, 71a, 72a, 73a, 74a, 75a are sent to the output circuits 76a, 77a, 78a, 79a, 80a, 81a, respectively. Also, the signal charges transferred rightward as illustrated by the signal charge transfer sections 70b, 71b, 72b, 73b, 74b, 75b are sent to the output circuits 76b, 77b, 78b, 79b, 80b, 81b, respectively.

The signal charges produced by the photosensitive element arrays 61, 62, 63 are led to the respective output circuits 76a, 76b, 77a, 77b, 78a, 78b, 79a, 79b, 80a, 80b, 81a, 81b, each formed of a signal charge detector and an analog circuit such as a source follower or an inverter, in this way.

The signal charges are then output in parallel through 12 channels as voltage signals OS1a (derived from a first half of the odd-numbered photosensitive elements of the array A), OS1b (derived from a second half of the odd-numbered photosensitive elements of the array A), OS2a (derived from a first half of the even-numbered photosensitive elements of the array A), OS2b (derived from a second half of the even-numbered photosensitive elements of the array A), OS3a (derived from a first half of the odd-numbered photosensitive elements of the array B), OS3b (derived from a second half of the odd-numbered photosensitive elements of the array B), OS4a (derived from a first half of the even-numbered photosensitive elements of the array B), OS4b (derived from a second half of the even-numbered photosensitive elements of the array B), OS5a (derived from a first half of the odd-numbered photosensitive elements of the array C), OS5b (derived from a second half of the odd-numbered photosensitive elements of the array C), OS6a (derived from a first half of the even-numbered photosensitive elements of the array C), and OS6b (derived from a second half of the even-numbered photosensitive elements of the array C).

The aforementioned 12-channel voltage signal outputs are delivered to an external signal processing circuit, which converts the 12-channel input voltage signals into voltage signals conforming geometrically to the arrangement of the photosensitive element arrays 61, 62, 63 (arrays A, B and C). The signal processing circuit has basically the same circuit configuration as shown in FIG. 2.

An image scanning apparatus employing the one-dimensional CCD image sensor 60 thus constructed scans a document image at a speed three times as high as the ordinary scanning speed selected when scanning the image with a resolution of 600 dpi. This means that the image scanning apparatus scans three lines (approximately 127 micrometers wide) of the image while moving a full-rate carriage in the slow scanning direction within a period during which a conventional image scanning apparatus would usually scan a single line (approximately 42.3 micrometers wide) of the image.

Twelve-channel analog voltage signals (signal charges) sequentially output in parallel every image reading cycle are converted into digital form by a signal processing circuit. The signal processing circuit further performs such signal processing operations as inversion of the order of the A/D-converted signals derived from the second halves of the photosensitive elements, recombination of the signals derived from the first and second halves of the photosensitive elements, and rearrangement of the signal charges by means of memories and associated circuit elements. The signals for one line picked up by each of the arrays A, B and C are then sequentially stored in an unillustrated memory.

Figure 6:
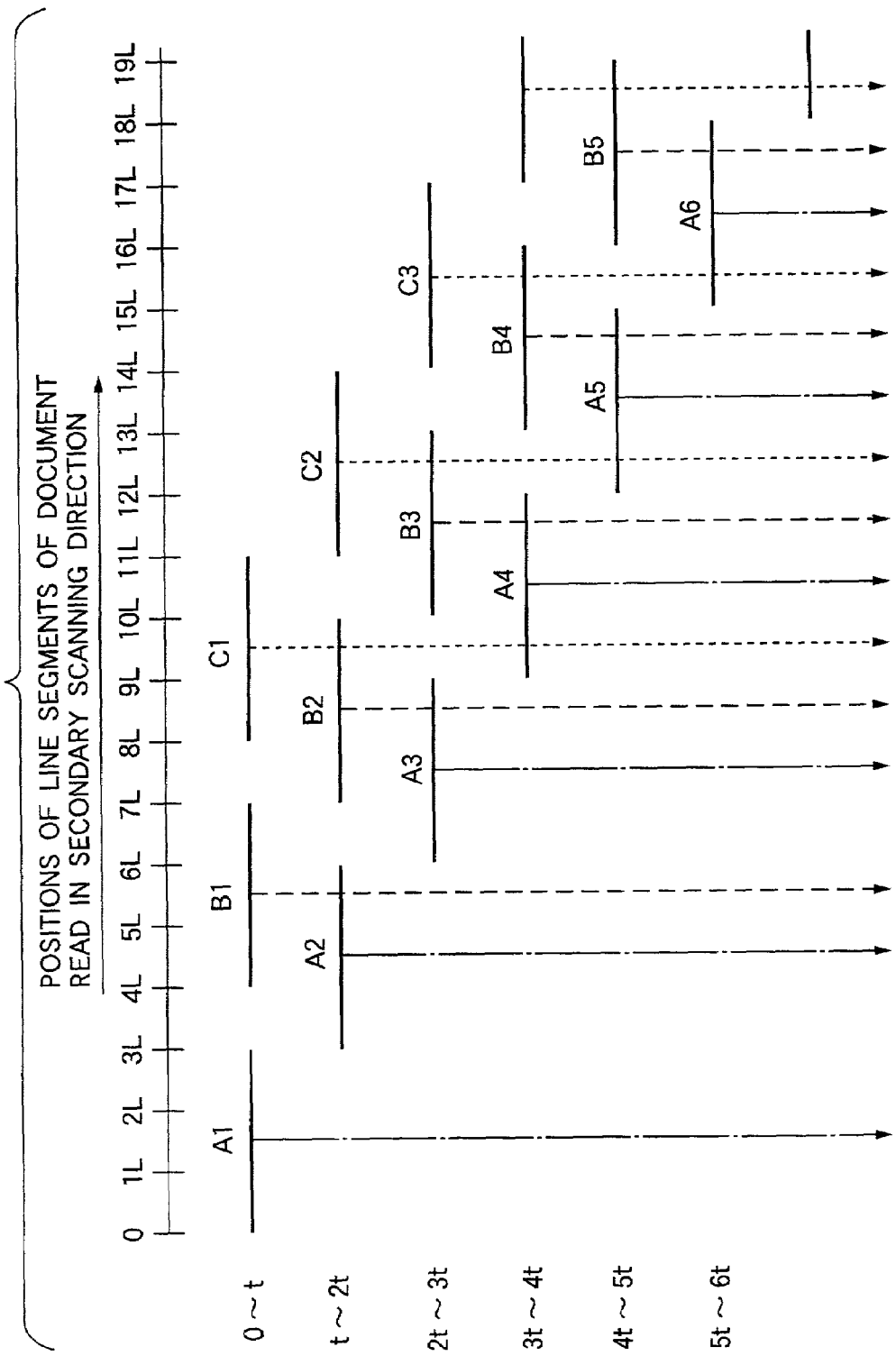
FIG. 6 is a chart showing the positions of line segments read by the one-dimensional CCD image sensor of the second embodiment in individual image reading periods.
Figure 7:
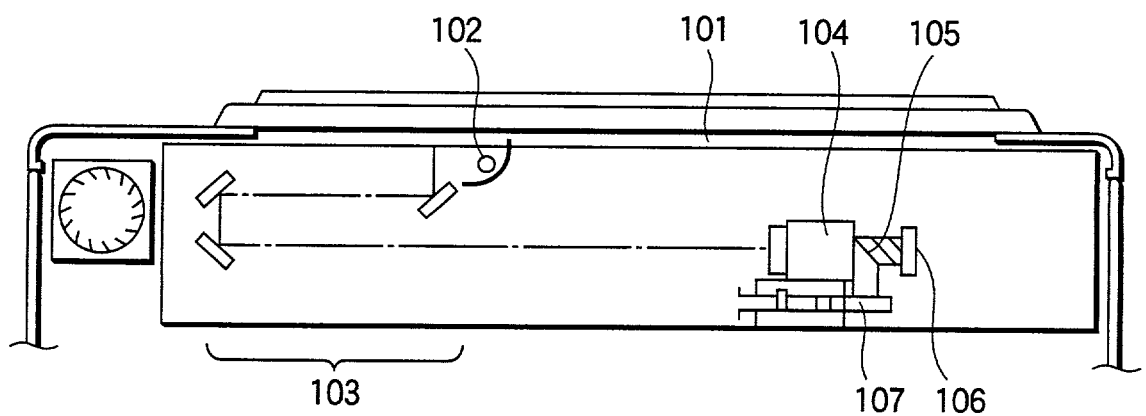
FIG. 7 is a schematic cross-sectional view of a conventional image scanning apparatus.

FIG. 6 shows a relationship between the positions of line segments read by the arrays A, B and C and their image reading periods. In this Figure, a line segment representing read-out information A1 output from the photosensitive element array 61 (array A) during the period 0-t indicates that the information A1 is an integral of pieces of information picked up from points 0 through 3L in the slow scanning direction of the document. It follows that the resolution in the slow scanning direction of the information individually read by the arrays A, B and C is 600/3 dpi=200 dpi.

As can be seen from FIG. 6, the positions of line segments read by the arrays A, B and C during a given image reading period are separated from each other by as much as the width of four lines in the slow scanning direction. For example, read-out information C1 read by the array C is the information derived from a middle point located just between read-out information A4 read by the array A and read-out information B2 read by the array B.

This means that if the read-out information read by the array A, the read-out information read by the array B and the read-out information read by the array C are combined with a time lag equal to 4/3 times the image reading cycle, that is, if the three sets of read-out information stored in the memory are rearranged and output with this time lag, it is possible to achieve a resolution of 600 dpi in the slow scanning direction which is three times as high as the resolution (200 dpi) of information lines read by the individual arrays A, B, C in the slow scanning direction. In other words, it is possible to scan document information at a speed three times as high as the ordinary scanning speed without reducing the resolution in the slow scanning direction.

Provided that the clock frequency used for driving the three-line image sensor is 20 MHz, data rates of the individual output circuits 76a, 76b, 77a, 77b, 78a, 78b, 79a, 79b, 80a, 80b, 81a, 81b are all 20 MHz and, therefore, data rates of the individual output signals of the arrays A, B and C are 20 MHz×4=80 MHz each. Since the signals produced by the arrays A, B and C are output in parallel simultaneously, an overall data rate is 240 MHz.

It is understood from the foregoing that the image scanning apparatus employing the three-line one-dimensional CCD image sensor of the second embodiment can achieve three times as high a scanning speed as the scanning speed obtained with the conventional image sensor having 4-channel outputs using one-dimensional CCD image sensor technology of the currently available performance.

Furthermore, since the distance between the photosensitive element arrays 61, 62 and 63 of the three-line one-dimensional CCD image sensor of the second embodiment is fixedly determined in its manufacturing stage as is the case with the two-line one-dimensional CCD image sensor of the first embodiment, the three-line one-dimensional CCD image sensor confers an advantage that precise positioning is not required when assembling it in the image scanning apparatus. In addition, since the light reflected by the document falls upon the CCD image sensor without being divided into different paths, the amount of light exposure of the CCD image sensor does not decrease, making it possible to read out the signal charges with a sufficiently high S/N ratio.

While the foregoing description of the second embodiment has dealt with an example of configuration in which the photosensitive element arrays 61, 62 and 63 each has 4-channel output sections from which the signal charges picked up by the arrays 61, 62 and 63 are read out, the invention is not limited to this configuration. The configuration may be modified such that the arrays 61, 62 and 63 each has two-channel output sections or a one-channel output section, for example, depending on applications.

A four-line-gap or eight-line-gap, three-line RGB color CCD image sensor, which is currently available for a full-color image scanning apparatus, with its on-chip color filter omitted, for example, may be used as the one-dimensional CCD image sensor of the aforementioned image scanning apparatus. What is essentially necessary for the one-dimensional CCD image sensor is that the distance between three photosensitive element arrays should satisfy conditions expressed by an equation shown below.

Furthermore, while the photosensitive element arrays 61, 62 and 63 of the three-line CCD image sensor 60 of the foregoing second embodiment are separated by a distance equal to the width of four lines (arrays), this distance is not necessarily limited to the width of four lines. The distance may be equal to the width of five lines or seven lines, for example, as long as the conditions expressed by the equation shown below are satisfied.

Specifically, when the scanning speed in the slow scanning direction is set to M times as high as the ordinary scanning speed so that the resolution in the slow scanning direction becomes equal to the resolution in the fast scanning direction, the distance between N number of lines of photosensitive element arrays (expressed in terms of the width of D lines) should satisfy the following equation:

$$D = M \cdot a / n$$

where $a \neq nN$.

Furthermore, although the three-line CCD image sensor 60 of the second embodiment having the three photosensitive element arrays 61, 62, 63 scans the document image at a speed three times as high as the ordinary scanning speed in the slow scanning direction, the scanning speed is not limited to an integral number of times (e.g. three times) the ordinary scanning speed. It may, for example, be 2.5 times or other noninteger times the ordinary scanning speed.

FIG. 8 is a diagram showing specific examples of CCD image sensors according to the invention. If N=2 and M=3, for instance, D should 1.5, 4.5, 7.5 and so forth, and if D=3, 6, 9, etc., the aforementioned conditions are not met.

The entire disclosure of Japanese Patent Application No. 2000-274320 filed on Sep. 11, 2000 including specification, claims, drawings and abstract is incorporated herein by reference in its entirety.

What is claimed is:

1. An image scanning apparatus comprising:
a one-dimensional image sensor arrangement including a one-dimensional sensor, at least part of the arrangement moving relatively in a slow scanning direction with respect to a document while scanning an image of the document in a fast scanning direction to obtain two-dimensional information on the document image,
wherein the one-dimensional image sensor has N number of photosensitive element arrays arranged parallel to the fast scanning direction, N being a positive integer greater than 1, and the N photosensitive element arrays simultaneously read N different lines of information of the document image; and
wherein a scanning speed in the slow scanning direction is multiplied by a factor of M without decreasing image scanning resolution when a moving speed of the moving part of the one-dimensional image sensor arrangement in the slow scanning direction is set to M times as high as an ordinary speed at which the resolution in the slow scanning direction becomes equal to the resolution in the fast scanning direction, M being a positive number.

2. The image scanning apparatus according to claim 1, wherein the one-dimensional image sensor has plural signal charge transfer circuits for transferring signal charges from each of the photosensitive element N arrays and an output circuit.

3. An image scanning apparatus comprising:
a one-dimensional image sensor arrangement including a one-dimensional sensor, at least part of the arrangement moving relatively in a slow scanning direction with respect to a document while scanning an image of the document in a fast scanning direction to obtain two-dimensional information on the document image,
wherein the one-dimensional image sensor has N number of non-color filtered photosensitive element arrays arranged parallel to the fast scanning direction, N being a positive integer greater than 1, and the N photosensitive element arrays simultaneously read N different lines of information of the document image, and
wherein each adjacent two of the N photosensitive element arrays are intervened by at least one respective signal charge transfer circuit that transfers signal charges from respective one of the intervened photosensitive element arrays and an output circuit.

4. The image scanning apparatus according to claim 3, wherein a scanning speed in the slow scanning direction is multiplied by a factor of M without decreasing image scanning resolution when a moving speed of the moving part of the one-dimensional image sensor arrangement in the slow scanning direction is set to M times as high as an ordinary speed at which the resolution in the slow scanning direction becomes equal to the resolution in the fast scanning direction, M being a positive number.

* * * * *